United States Patent
Bone

(10) Patent No.: US 9,052,941 B1
(45) Date of Patent: Jun. 9, 2015

(54) AUTOMATED TESTING OF ONLINE FUNCTIONALITY PROVIDERS

(75) Inventor: Ian M. Bone, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 678 days.

(21) Appl. No.: 13/118,043

(22) Filed: May 27, 2011

(51) Int. Cl.
G06Q 30/00 (2012.01)
G06F 9/46 (2006.01)

(52) U.S. Cl.
CPC .................................. G06F 9/46 (2013.01)

(58) Field of Classification Search
CPC .......................................... G06Q 30/06–30/08
USPC .............................................. 705/26.1–27.2
See application file for complete search history.

(56) References Cited

U.S. PATENT DOCUMENTS

| | | | |
|---|---|---|---|
| 7,197,459 B1 | 3/2007 | Harinarayan et al. | 704/270.1 |
| 7,801,128 B2 | 9/2010 | Hoole et al. | 370/389 |
| 7,945,469 B2 | 5/2011 | Cohen et al. | 705/9 |
| 2003/0149765 A1* | 8/2003 | Hubbard et al. | 709/224 |
| 2006/0106675 A1* | 5/2006 | Cohen et al. | 705/26 |
| 2010/0161281 A1* | 6/2010 | Brown et al. | 702/186 |

OTHER PUBLICATIONS

"distributed.net," retrieved on May 26, 2011, from http://en.wikipedia.org/wiki/Distributed.net, 4 pages.
"Go Daddy Hosting Connection—One-Click Hosting Applications," retrieved on May 26, 2011, from http://hostingconnection.godaddy.com/Home.aspx, 2 pages.
"SETI@home," retrieved on May 26, 2011, from http://en.wikipedia.org/wiki/SETI#home, 8 pages.
"Web Hosting—Secure Hosting Plans with Unlimited Bandwidth," retrieved on May 26, 2011, from http://www.godaddy.com/hosting/web-hosting.aspx?ci=8971, 4 pages.

* cited by examiner

Primary Examiner — Ethan D Civan
(74) Attorney, Agent, or Firm — Seed IP Law Group PLLC

(57) ABSTRACT

Techniques are described for automatically testing network-accessible functionality, such as in at least some situations based on automated operations of a distributed automated functionality testing system. In at least some such situations, the network-accessible functionality may be provided by an online service, such as if the provider of the online service is a client of the distributed automated functionality testing system. In addition, in at least some situations, the testing performed by the distributed automated functionality testing system uses numerous member computing devices that are owned or otherwise controlled by various users who are not part of the distributed automated functionality testing system or otherwise affiliated with each other, but who register the member computing devices with the distributed automated functionality testing system as being available for later use in performing testing actions, such as in return for monetary fees or other compensation.

26 Claims, 5 Drawing Sheets

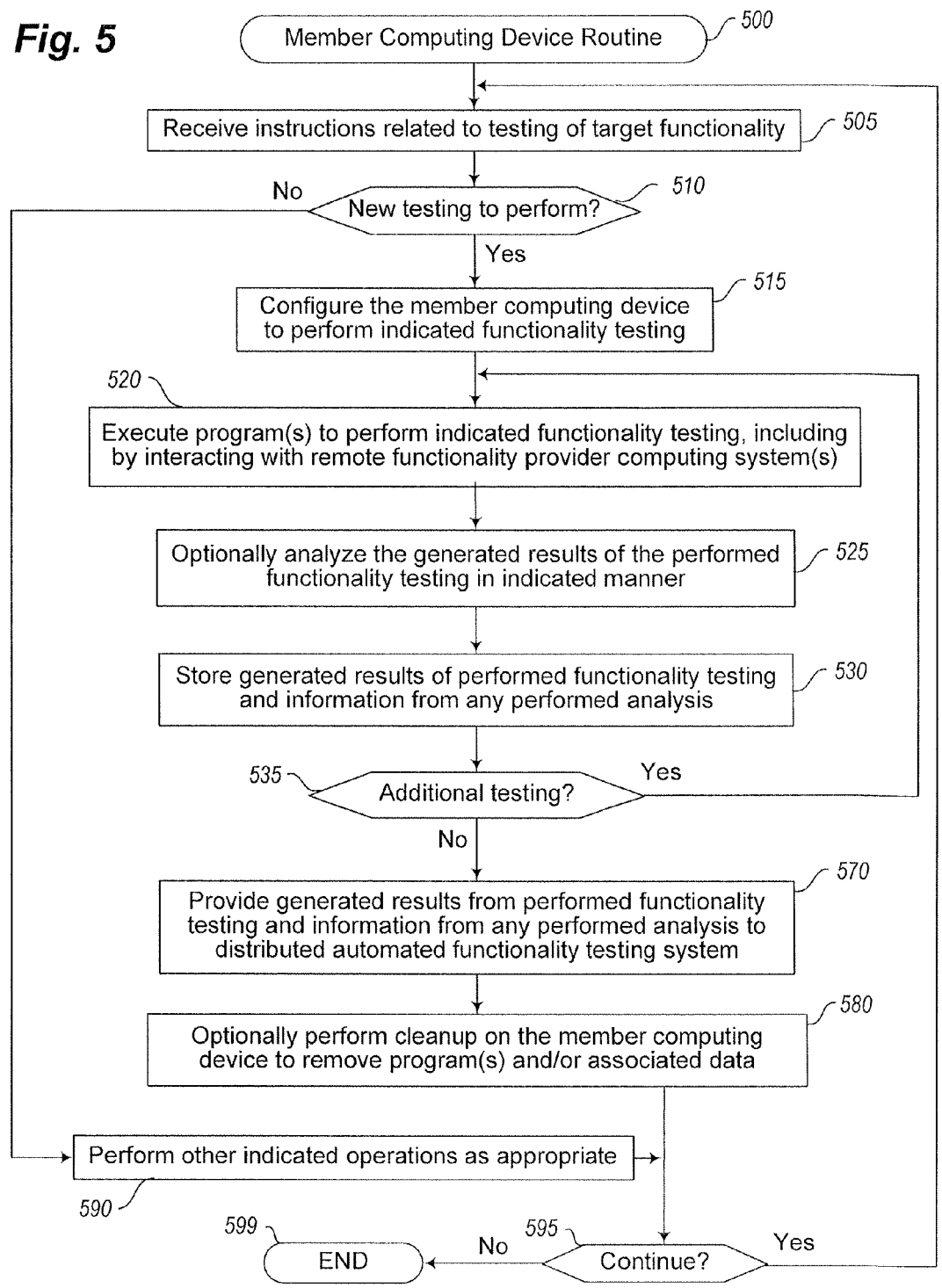

AUTOMATED TESTING OF ONLINE FUNCTIONALITY PROVIDERS

BACKGROUND

The Internet comprises a vast number of computers and computer networks that are interconnected through communication links, with information being exchanged using various services such as electronic mail and the World Wide Web (also referred to as the "Web"). In addition to providing access to information, the Web has become a medium that is used to search for, shop for and order items (such as products, services and/or information) that are for purchase, rent, lease, license, trade, evaluation, sampling, subscription to, etc. In many circumstances, a user can visit the Web site of a Web merchant (or a "Web store") or otherwise interact with an online retailer or electronic marketplace that provides one or more items, such as to view information about the items, give an instruction to place an order for one or more items, and provide information needed to complete the purchase (e.g., payment and shipping information). The Web merchant then fulfills the order by providing the ordered items to the indicated recipient, such as by providing product items that have been ordered through physical distribution channels (e.g., shipment via a governmental postal service or private common carrier) or electronically (e.g., via download over the Internet, such as for digital music or videos) as appropriate. Ordered service items may similarly be provided electronically (e.g., providing email service) or physically (e.g., performing cleaning services at the purchaser's house).

The widespread popularity of the Web has also provided additional opportunities for computers to inter-communicate in various programmatic manners. For example, there is growing use of the Web to provide so-called "Web services," which typically involve the programmatic interaction of remote applications to exchange information via defined APIs ("application program interfaces"), or the like. Web services may allow heterogeneous applications and computers to interact, and can be defined and implemented using a variety of underlying protocols and techniques. For example, some Web service implementations return data in XML ("eXtensible Markup Language") format using HTTP ("Hyper-Text Transport Protocol") in response to a Web service invocation request specified as a URI ("Uniform Resource Identifier"), such as a URL ("Uniform Resource Locator") that includes a specified operation and one or more query parameters. In other implementations, additional underlying protocols are used for various purposes, such as SOAP ("Simple Object Access Protocol") for standard message exchange, WSDL ("Web Services Description Language") for description of service invocations, and UDDI ("Universal Description, Discovery, and Integration service") for discovery of available services.

BRIEF DESCRIPTION OF THE DRAWINGS

FIG. 5 is a flow diagram of an example embodiment of a Member Computing Device routine.

DETAILED DESCRIPTION

Figure 1:
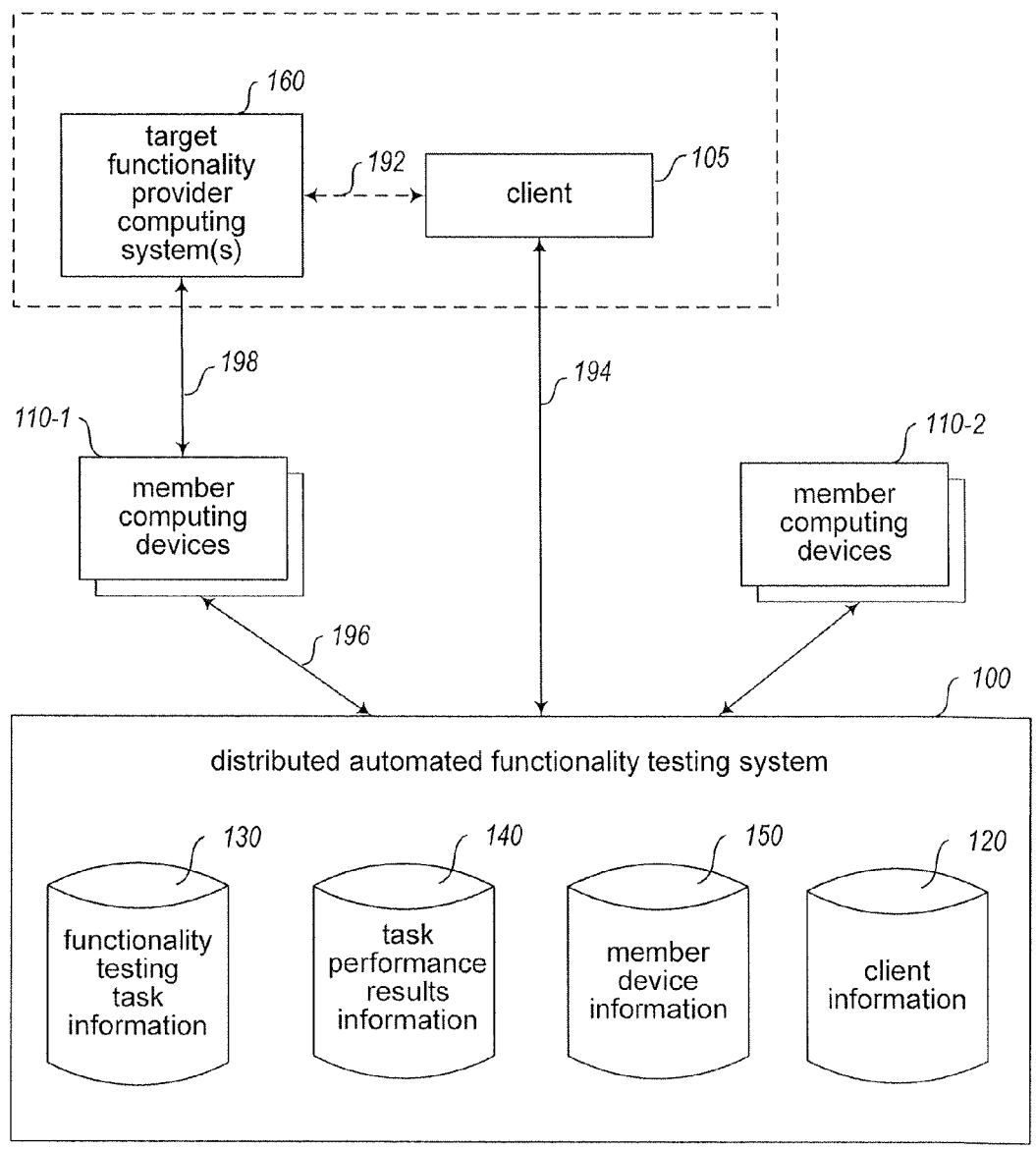
FIG. 1 is a block diagram illustrating an example embodiment of a system that enables distributed automated testing of online functionality providers.

Techniques are described for automatically testing network-accessible functionality, such as in at least some embodiments based on automated operations of a distributed automated functionality testing system, as discussed in greater detail below. In at least some such embodiments, the network-accessible functionality may be provided by an online service, such as if the provider of the online service is a client of the distributed automated functionality testing system. In addition, in at least some embodiments, the testing performed by the distributed automated functionality testing system uses a pool of numerous member computing devices that are owned or otherwise controlled by various users who are not part of the distributed automated functionality testing system or otherwise affiliated with each other, but who register the member computing devices with the distributed automated functionality testing system as being available for later use in performing testing actions, such as in return for monetary fees or other compensation.

As one illustrative example, a provider of an online service may desire to test particular target functionality of the online service, such as to perform load testing or stress testing based on a large number (e.g., hundreds, thousands, tens of thousands, hundreds of thousands, millions, etc.) of user devices accessing the target functionality simultaneously or in one or more other access patterns designated by the provider. The target functionality of the online service may include, for example, streaming non-interactive content (e.g., streaming music or video), streaming interactive content (e.g., streaming gaming-related content), or various other types of functionality that is not related to streaming information (e.g., a Web server responding to requests to serve Web pages, performing content downloads, performing a type of manipulation of user-provided information, etc.). If so, the provider of the online service may request that the distributed automated functionality testing system perform a particular type of testing of the target functionality (e.g., in exchange for a fee supplied by the provider to the distributed automated functionality testing system) and assess one or more specified performance criteria of the providing of the target functionality, such as latency, the quality of streamed content, an error rate, etc. Furthermore, the provider of the online service may specify one or more other conditions related to the testing to be performed, such as one or more of the following: a number of member computing devices of the distributed automated functionality testing system to be used in the testing; one or more particular attributes of those member computing devices, such as to have uniformity or diversity in attributes such as geographic location of the member computing devices, a particular hardware computing environment of the member computing devices, a particular software computing environment of the member computing devices, a provider of network service to the member computing devices, an amount of network bandwidth available to the member computing devices, etc.; particular timing for the performance of the testing; a particular application program to be executed on the member computing devices that will perform particular types of interactions with the target functionality; etc.

In such situations, the distributed automated functionality testing system responds to the request by the online service provider in accordance with any specified conditions if possible, including to perform the distributed testing of the target functionality, assess the specified performance criteria, and supply corresponding results information to the online service provider. The performance of the distributed testing of the target functionality by the distributed automated functionality testing system may include, for example, selecting appropriate member computing devices to use for the testing in accordance with the request of the online service provider, configuring those selected member computing devices (e.g., loading a particular application program that was supplied or otherwise indicated by the online service provider) to perform appropriate functionality testing tasks to test the target functionality based at least in part on interactions with one or more target computing systems of the online service, initiating the performance of those functionality testing tasks by those selected member computing devices, obtaining and aggregating results of the performance of those functionality testing tasks, and assessing the specified performance criteria based at least in part on those aggregated results. For example, if the target functionality includes streaming interactive content that includes a specified interactive game involving streamed high-definition video, the member computing devices may perform functionality testing tasks that include requesting from a specified target computing system the execution of the game, performing real-time decoding of the high-definition video, supplying game-related inputs to the specified target computing system, uploading supplied content to the specified target computing system, etc., and further may assess the particular performance criteria of interest for those performed functionality testing tasks.

As previously noted, in at least some embodiments, the testing functionality of the distributed automated functionality testing system uses numerous third-party member computing devices, such as member computing devices that are owned or otherwise controlled by various users who are not part of the distributed automated functionality testing system or otherwise affiliated with each other. The member computing devices may, for example, be a diverse group of geographically distributed and heterogeneous computing devices with varying attributes that may affect at least some functionality testing tasks that those member computing devices perform. Such varying attributes of the member computing devices may include, for example, one or more of the following: geographic location; network location (e.g., relative to a target computing system to be interacted with, such as may be measured by, for example, network latency or ping response time); type of operating system software; type of application software; type of hardware component or device (e.g., CPU, storage, memory, network connection, video card, sound card, etc.); availability of a particular capability (e.g., a Web cam); amount of network bandwidth available; type of network service used (e.g., Wi-Fi, DSL, cable service via cable modem, 3G wireless service, 4G wireless service, Wi-Max, dial-up, etc.); provider of network service (e.g., company AAA versus company BBB); etc. In addition, in at least some embodiments, particular member computing devices are selected by the distributed automated functionality testing system for use with particular functionality testing tasks based at least in part of the attributes of the selected member computing devices, as discussed in greater detail below.

The users who own or otherwise control the various member computing devices may register the member computing devices with the distributed automated functionality testing system or otherwise indicate that the member computing devices are available for later use in performing testing actions in various manners in various embodiments, and as part of doing so, the users may initiate or authorize the loading and execution of a client module of the distributed automated functionality testing system on each member computing device. The distributed automated functionality testing system may then interact with the client modules on the member computing devices for various reasons, such as to configure a particular member computing device to perform one or more particular functionality testing tasks (e.g., to execute a particular program that performs specified types of interactions with a particular target computing system, and that assesses one or performance criteria related to the performed interactions), to obtain results from previously performed functionality testing tasks, etc.

In some embodiments and situations, some or all of the users may initiate contact with the distributed automated functionality testing system to register their member computing devices, such as in exchange for monetary fees provided to the users for use of the member computing devices. In other embodiments, users may be able to opt-in (or opt-out) of having a computing device join the distributed automated functionality testing system (e.g., by loading and executing the client module on the computing device) as part of other functionality being provided to the user, such as if the user is using that computing device to receive other types of functionality, such as from another system that is also provided by the provider of the distributed automated functionality testing system or that is otherwise affiliated with the distributed automated functionality testing system. Such other types of functionality may include, for example, one or more of the following: receiving streaming content or receiving content downloads, participating in an online gaming environment or otherwise using online functionality of a game, being part of beta testing or other limited availability of an online service, etc. Furthermore, in some embodiments, the users may receive other types of benefits for making the member computing devices available to the distributed automated functionality testing system, whether in addition to or instead of monetary fees, such as credits within an online service, rewards within an online game or gaming environment, etc., such as in conjunction with an online service or game with which the user was interacting to opt-in to joining the distributed automated functionality testing system. In other embodiments, the actions of a user in registering a member computing device and/or particular functionality testing tasks that are performed by a registered member computing device may be part of one or more tasks supplied by a task fulfillment system to which the user belongs, with one example of such a task fulfillment system being described in greater detail in pending commonly-owned U.S. patent application Ser. No. 10/990,949, filed Nov. 16, 2004 and entitled "Providing an Electronic Marketplace to Facilitate Human Performance of Programmatically Submitted Tasks;" which is hereby incorporated by reference in its entirety.

In addition, the clients who interact with the distributed automated functionality testing system may have various forms in various embodiments. For example, in at least some embodiments, some or all of the clients are fee-based customers of the distributed automated functionality testing system who provide payment to the distributed automated functionality testing system for providing requested distributed testing of target functionality of the clients. In other embodiments, one or more clients of the distributed automated functionality testing system may have other forms, including in some embodiments for the distributed automated functionality testing system to be provided by an entity for its own purposes in performing distributed testing of internal functionality of the entity. The clients may access the distributed automated functionality testing system in various manners and provide various types of information. For example, as part of a request by the client to the distributed automated functionality testing system to provide distributed testing of target functionality of the client, the client may supply information of one or more of the following types: a type of testing to be performed (e.g., load testing), a testing program to be executed by member computing devices performing the testing, information about how to access the provider computing system(s) 160 and/or the target functionality, conditions related to any member computing devices selected to perform the testing (e.g., related to geographical locations, to one or more capabilities and/or other current characteristics of the member computing devices, etc.), one or more performance criteria to be assessed, compensation (e.g., monetary payments) for the testing (e.g., including optional benefits to be provided to users associated with the selected member computing devices related to the target functionality being provided or to other functionality available from the client), etc.

FIG. 1 is a block diagram illustrating an example of a distributed automated functionality testing system that enables distributed automated testing of network-accessible functionality. In particular, in this example, a Distributed Automated Functionality Testing System 100 embodiment performs distributed testing of target functionality of clients by using various member computing devices 110 (e.g., numerous geographically distributed and heterogeneous member computing devices having varying attributes).

For illustrative purposes, some embodiments are described herein in which specific types of users and systems interact in specific ways, and in which the systems store specific types of data and provide specific types of related functionality. For example, in the illustrated embodiment, the Distributed Automated Functionality Testing System 100 is distinct from the various clients that request performance of distributed testing of target functionality, although in other embodiments a single system may both provide the target functionality to be tested and operate an embodiment of a distributed automated functionality testing system to perform that testing, or an embodiment of a distributed automated functionality testing system may otherwise provide functionality to only a single client. These examples are provided for illustrative purposes and are simplified for the sake of brevity, and the techniques disclosed herein can be used in a wide variety of other situations, some of which are described herein. For example, while in some embodiments all of the member computing devices are provided by users who are not affiliated with the distributed automated functionality testing system, in other embodiments at least some of the member computing devices may be owned or otherwise controlled by the distributed automated functionality testing system. In addition, while some of the described embodiments involve using the member computing devices to perform functionality testing tasks as part of distributed testing of target functionality, in other embodiments some or all of the member computing devices may be used to perform other types of automated tasks, whether instead of or in addition to such functionality testing tasks, and whether by the distributed automated functionality testing system or another analogous type of system that uses such types of member computing devices to perform other types of tasks. Non-exclusive examples of other types of automated tasks that may be performed by member computing devices include the following: participating in an online service that performs distributed execution of programs, such as based on using MapReduce execution methodology for processing and generating large data sets by performing at least a first phase of various map functions and a second phase of various reduce functions; participating in a program execution service that executes programs for remote customers; etc. Additional details related to an example online service that performs distributed execution of programs, for which member computing devices could be used to participate in program execution as part of additional types of automated tasks, are included in pending commonly-owned U.S. patent application Ser. No. 12/825,073, filed Jun. 28, 2010 and entitled "Dynamic Scaling Of A Cluster Of Computing Nodes Used For Distributed Execution Of A Program;" which is hereby incorporated by reference in its entirety. Additional details related to an example program execution service that performs execution of programs for customers, for which member computing devices could be used to participate in program execution as part of additional types of automated tasks, are included in pending commonly-owned U.S. patent application Ser. No. 12/950,630, filed Nov. 19, 2010 and entitled "Predictive Governing Of Dynamic Modification Of Program Execution Capacity;" which is hereby incorporated by reference in its entirety.

In the example of FIG. 1, one or more clients supply information to the Distributed Automated Functionality Testing System 100 about target functionality to be tested by the member computing devices 110, including example client 105 who interacts 194 with the system 100 to request testing of target functionality (not shown) provided by one or more associated target functionality provider computing systems 160. The client 105 may interact with the system 100 in various manners, such as via a user representative of the client 105 who interactively accesses the system 100 (e.g., via a GUI, or graphical user interface, displayed on a computing system of the user, not shown, such as a GUI based on Web pages provided by the system 100 and/or based on execution of a client-side application on the computing system), or a software application of the client that is programmatically interacting with the system 100 (e.g., via an API of the system 100, not shown) on behalf of the client. The client 105 may also supply various information as part of the request, as discussed in greater detail elsewhere. In addition, the client 105 may also optionally perform various types of interactions 192 with the computing system(s) 160 before or during the testing (e.g., to gather information related to testing to be performed, to monitor particular aspects of the behavior of the computing system(s) 160 during the testing, etc.). While the client 105 is the provider of the target functionality and controls the computing system(s) 160 in this example, in other embodiments a client may request testing of target functionality provided by other entities in at least some situations.

The Distributed Automated Functionality Testing System 100 may be implemented in various ways in various embodiments, such as in the form of a software system executing on one or more programmed or otherwise configured computing systems or devices (not shown). For example, while the Distributed Automated Functionality Testing System 100 is illustrated in this example as being part of a system that is provided distinctly from the member computing devices 110, in at least some embodiments the system 100 may instead be provided in part or in whole in a distributed manner by software executing on the member computing devices 110. More generally, a variety of types of network topologies may be used in various embodiments, such as one or more of the following non-exclusive list: a star network topology; a ring network topology; a bus network topology; a mesh network topology; etc.

In this example, the Distributed Automated Functionality Testing System 100 includes a functionality testing task information data repository 130 to store various information about functionality testing tasks performed by member computing devices for clients, a functionality testing task performance results information data repository 140 to store various information about results of performed functionality testing tasks, a member computing device information data repository 150 to store various information about member computing devices (e.g., device attributes; information about associated users, such as to enable providing compensation for use of the member computing device in performing functionality testing tasks; etc.), and a client information data repository 120 to store various information about the clients (e.g., testing requests, payment information, etc.).

After the client 105 requests the testing of the target functionality, the Distributed Automated Functionality Testing System 100 in this example then proceeds to perform the requested testing using various of the member computing devices 110. In particular, in this example, the system 100 selects a subset 110-1 of some of the member computing devices 110, and performs automated programmatic interactions 196 over one or more intervening networks (not shown) with those selected member computing devices to initiate the requested testing. For example, each of the member computing devices may execute a client module (not shown) of the system 100, and the system 100 may interact with the client modules on the selected member computing devices 110-1 to configure those member computing devices to perform designated functionality testing tasks as part of the requested testing, such as to interact with particular provider computing system(s) 160 in particular manners and to assess particular performance criteria. The system 100 may similarly interact with the client modules on the selected member computing devices 110-1 to initiate the performance of the functionality testing tasks by those configured member computing devices. After the functionality testing tasks are completed, the results of the task performance are supplied 196 to the Distributed Automated Functionality Testing System 100 (whether as requested by the system 100 to pull those results from the devices 110-1 and/or as proactively sent by the devices 110-1 to push those results to the system 100). The Distributed Automated Functionality Testing System 100 may then optionally perform additional activities as part of the requested testing, such as to aggregate results from the various devices 110-1 and optionally perform additional analysis, before providing 194 information about the results of the requested testing to the client 105. While the selected member computing devices 110-1 are illustrated together as a single group in this example, it will be appreciated that the devices 110-1 may be selected based on being widely distributed geographically (e.g., in different states, in different countries, etc.) and/or based on otherwise being heterogeneous or homogeneous with respect to one or more attributes, as discussed in greater detail elsewhere. The example of FIG. 2 provides additional details regarding one illustrative example of selecting various heterogeneous member computing devices.

The system 100 also provides various functionality related to the management of the member computing devices and their associated users. For example, such users may register with the system 100 by providing information about the member computing devices (e.g., via a GUI of the system 100) or otherwise initiating loading of client modules of the system 100 on those computing devices, and optionally providing various identifying information about the users (e.g., name, address, telephone number(s), email addresses, user preference information about when and whether to use their member computing devices for distributed testing tasks, etc.). Such user-related information may be stored by the system 100 in the information data repository 150 or elsewhere, and the system 100 may further provide information to users about their member computing devices at various times (e.g., upon user request or periodically or upon occurrence of a relevant type of event, such as use of the member computing device for distributed testing, including to provide information about payment or other compensation earned for the user).

Figure 2:
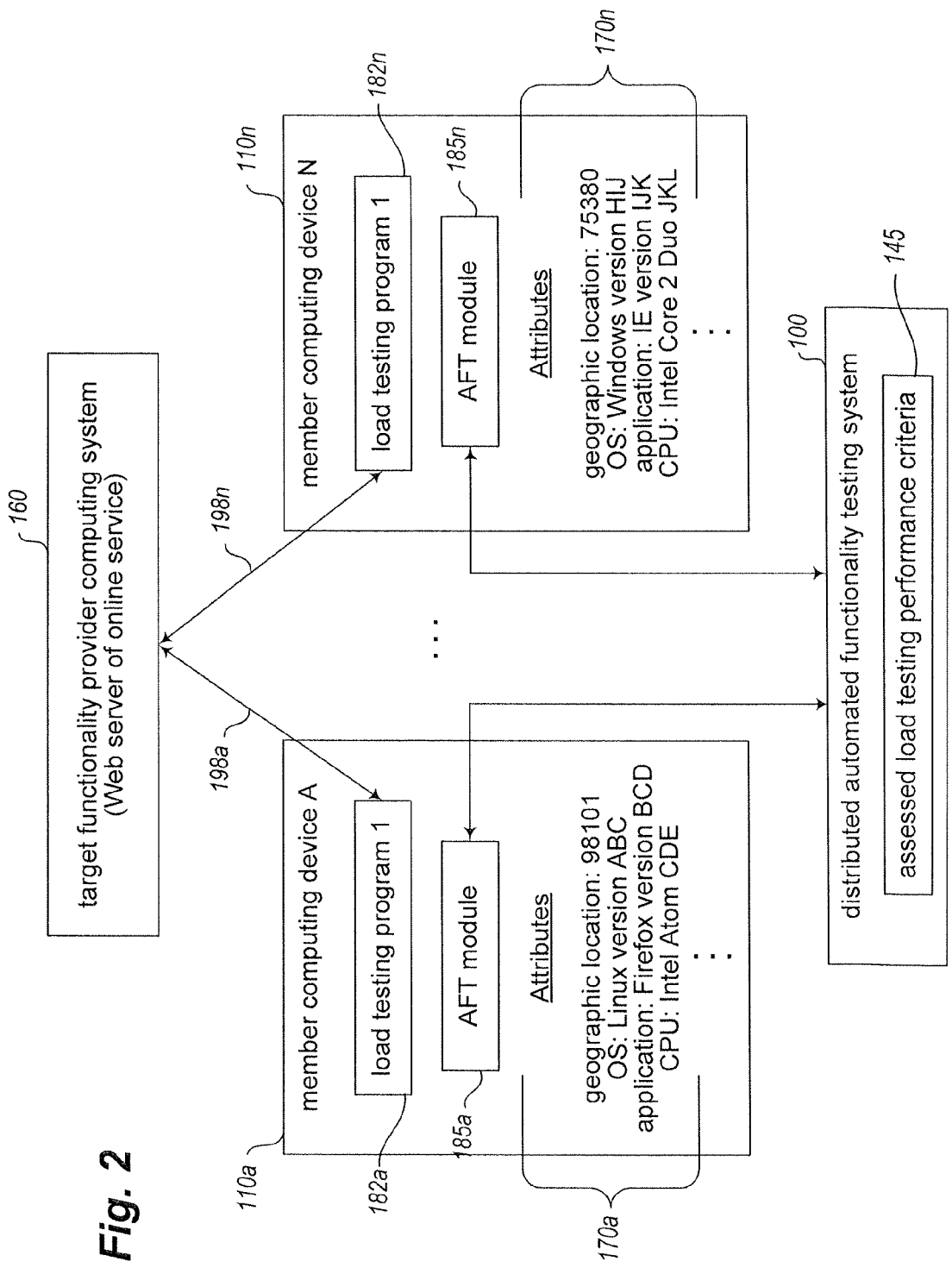
FIG. 2 illustrates an example of performing distributed automated testing of network-accessible functionality, such as based in part on using a diverse group of geographically distributed and heterogeneous member computing devices.

FIG. 2 illustrates a further example of an embodiment of the distributed automated functionality testing system performing distributed testing of network-accessible functionality for a client. In particular, in the example of FIG. 2, the one or more target functionality provider computing systems 160 of the client 105 of FIG. 1 provide a Web server for an online service provided by the client 105, and the requested testing of the target functionality is to perform load testing of a particular type of functionality of the Web server (e.g., serving Web pages).

Accordingly, after the distributed automated functionality testing system 100 embodiment receives the request from client 105 (not shown), the system 100 selects the particular member computing devices 110-1 to use to perform distributed testing of the target functionality, with the illustrated member computing devices 110a-110n being those selected member computing devices 110-1 in this example, and including any number N member computing devices. In addition, in this example, a goal of the distributed testing is to use member computing devices that are geographically diverse, and may also optionally be to use member computing devices that are diverse with respect to one or more other attributes, such as with respect to the hardware and/or software computing environments of those member computing devices. Accordingly, the illustrated member computing devices 110a and 110n are each illustrated with information 170 about various attributes of those member computing devices, and in this example show different member computing devices selected in different states of the United States (e.g., with member computing device A 110a being in Seattle, Wash. at zip code 98101, and with member computing device N 110n being in Dallas, Tex. at zip code 75380)—it will be appreciated that geographic location information may be obtained and represented in various forms in various embodiments, including GPS coordinates. In addition, the example member computing devices A and N differ in other attributes as well in this example, such as by having different hardware computing environments (e.g., different CPU processors, and optionally other different hardware components, not shown) and by having different software computing environments (e.g., different operating systems and application software).

In this illustrated example, each of the selected member computing devices 110 executes a client module 185 of the distributed Automated Functionality Testing ("AFT") system 100, and the system 100 performs interactions with those client modules 185 to configure the selected member computing devices 110 to perform functionality testing tasks of the distributed load testing of the provider computing system(s) 160. In this example, the configuration of the selected member computing devices 110 includes initiating a copy of a load testing program 182 on each of the selected member computing devices 110, such as a load testing program provided by the client 105 or a default load testing program made available by the system 100. During the performance of the functionality testing tasks, the selected member computing devices 110 each perform interactions 198 with the provided computing system(s) 160, such as to request Web pages from the Web server or to otherwise access the target functionality in a configured manner. After the selected member computing devices 110 obtain results from the performance of the functionality testing tasks and optionally assess particular performance criteria related to that performance, the selected member computing devices 110 provide corresponding information to the system 100. The system 100 then optionally performs additional assessment, such as based on an aggregation of the performance results, and in this example stores the assessed performance criteria information 145. Information about the assessed performance criteria information 145 is then made available (not shown) to the client 105.

It will be appreciated that various details of the example of FIG. 2 are provided for illustrative purposes only, and are not intended to limit the described invention.

As previously noted, in at least some embodiments, the member computing devices may have various values for one or more attributes. In some embodiments, the distributed automated functionality testing system may group member computing devices in various manners based on one or more such attributes, such as to group member computing devices by, for example, geographic location and/or operating system software type. In addition, the distributed automated functionality testing system may use one or more of the attributes to select particular member computing devices to participate in particular distributed testing functionality to be provided. For example, if the member computing devices have been grouped by geographic location and particular distributed testing functionality is to include widely dispersed member computing devices, the distributed automated functionality testing system may select one or more member computing devices to use for each of the geographic location groups. Alternatively, if other particular distributed testing functionality is to use member computing devices in a single geographic location, the distributed automated functionality testing system may select some or all member computing devices to use from a group corresponding to that geographic location. As discussed in greater detail elsewhere, a variety of other types of attributes may be used in other situations, including the type of network service being used by a member computing device, a provider of network service being used by a member computing device, etc. In addition, it will be appreciated that values for particular attributes may change for particular member computing devices (e.g., based on movement of a mobile member computing device; based on a change in network service that is being used, such as between Wi-Fi and cellular service, between 3G wireless and 4G wireless, etc.; based on a change in installed software or hardware components; etc.), and in some such embodiments, such changes may be reported to the distributed automated functionality testing system for a member computing device by a client module on the member computing device (e.g., when the change occurs, periodically, upon request from the distributed automated functionality testing system, etc.), and the inclusion of particular member computing devices for particular sets of distributed testing may change based on such attribute changes.

Moreover, other factors may be used to select particular member computing devices at particular times, whether instead of or in addition to attribute-based selection. For example, some member computing devices may only be available at particular times (e.g., during a specified time range of hours, days, etc.; while the member computing device is not in use by the associated user for other tasks; etc.) and/or when other particular conditions are satisfied (e.g., for a particular type of functionality testing task, for a particular type or amount of compensation, etc.), and if so may only be selected if those time-based conditions and/or non-time-based conditions are satisfied. Furthermore, in some embodiments, the selection of particular member computing devices may be based at least in part on current conditions for those member computing devices, and if so such a factor may be used in the selection, such as based on current condition information that is provided to the distributed automated functionality testing system for a member computing device by the client module executing on the member computing device (e.g., periodically, upon request from the distributed automated functionality testing system, etc.). Furthermore, some distributed testing may be sufficiently resource intensive and/or sensitive to real-time performance that only member computing devices without virtualized computing environments are used, while in other situations only member computing devices with virtualized computing environments are used. In yet other embodiments, member computing devices may be selected in other manners (e.g., randomly, in round robin fashion, etc.).

In addition, in at least some embodiments, the number of member computing devices that are selected to participate in a particular set of distributed testing may exceed the actual number needed, such as based on an expectation that some of the selected member computing devices may become unavailable to finish their testing tasks (e.g., due to failure of network connectivity to the selected member computing device; due to a user of the selected member computing device initiating other activities on the device, such as any other activities or particular activities that are incompatible with the testing tasks; due to the selected member computing device being shutdown or otherwise ceasing operations; etc.). Furthermore, in at least some such embodiments, the distributed automated functionality testing system may maintain information about the current availability of particular member computing devices, such as by having a software module on those member computing devices send periodic heartbeat messages, by pinging or otherwise polling those member computing devices to obtain responses, etc.—when member computing devices that are being used for particular distributed testing activities become unavailable, the distributed automated functionality testing system may perform various activities (e.g., remove those member computing devices from future consideration for use until they become available; track those member computing devices to ensure that other member computing devices performing those distributed testing activities are sufficient to complete those distributed testing activities; add new member computing devices to perform those distributed testing activities in place of those unavailable member computing devices; etc.).

In addition, particular member computing devices may be configured and otherwise prepared to participate in particular distributed testing in various manners in various embodiments. For example, as previously noted, a member computing device may be configured to execute a client module of the distributed automated functionality testing system during at least some times, such as to enable the distributed automated functionality testing system to interact with the member computing device. In addition, one or more types of testing programs may be loaded onto particular member computing devices, whether at a time of initial registration of the member computing device for later use or at a time of planned use of that testing program. Furthermore, the configuration of a member computing device to participate in particular distributed testing for a particular client may include, for example, providing information to the member computing device about how to access target functionality of that client, about particular performance criteria to assess, about particular functionality testing tasks to perform (e.g., about a particular testing program to use, about particular types of requests or other interactions to make with a provider computing system, etc.), etc.

Compensation may be provided to users associated with member computing devices in various manners in various embodiments. In some embodiments, a user associated with a member computing device receives compensation only for actual functionality testing tasks that the member computing device performs, while in other embodiments other types of compensation may be used (e.g., initial compensation paid for registering a member computing device, periodic ongoing compensation paid for a member computing device continuing to be available to the distributed automated functionality testing system, etc.). In addition, compensation that is provided for performing functionality testing tasks may in some embodiments be paid for completion of particular functionality testing tasks, while in other embodiments may be paid based on a particular amount of computing capacity provided or work performed. In some such latter embodiments, to facilitate uniform compensation to different member computing devices with different capabilities, an abstract unit of work may be defined for which a specified amount of compensation is provided, such as a standardized unit of work for use with heterogeneous types of member computing devices. Such a defined unit of work may be based on, for example, use of a specified amount of one or more computing resources for a specified amount of time, such as a specified amount of CPU cycles, volatile memory, non-volatile storage, network bandwidth, etc. In such cases, a quantity of defined work units that are performed by each member computing device may be monitored or otherwise determined, and used to determine an amount of compensation to be allocated to that member computing device.

Clients of the distributed automated functionality testing system may provide payment to the distributed automated functionality testing system in various manners in various embodiments. For example, in some embodiments and situations, the fees that are charged to a client may include a fixed fee for a specified type or amount of distributed testing that is provided, and/or a usage-based fee that varies with an amount of distributed testing that is provided. Such usage-based fees may be based on, for example, one or more of a quantity of member computing devices used, an aggregate amount of time that the distributed testing is performed, a quantity of defined work units that are performed, a type of distributed testing that is performed, etc. In addition, rather than having predefined fees for a specified amount of distributed testing, in some embodiments other types of fee determination mechanisms may be used, such as to have the fees that the distributed automated functionality testing system charges vary over time or based on current conditions. In such situations, clients may, for example, submit bids for distributed testing to be performed, with the distributed automated functionality testing system accepting the highest bid or the bid that otherwise satisfies one or more defined criteria.

Figure 3:
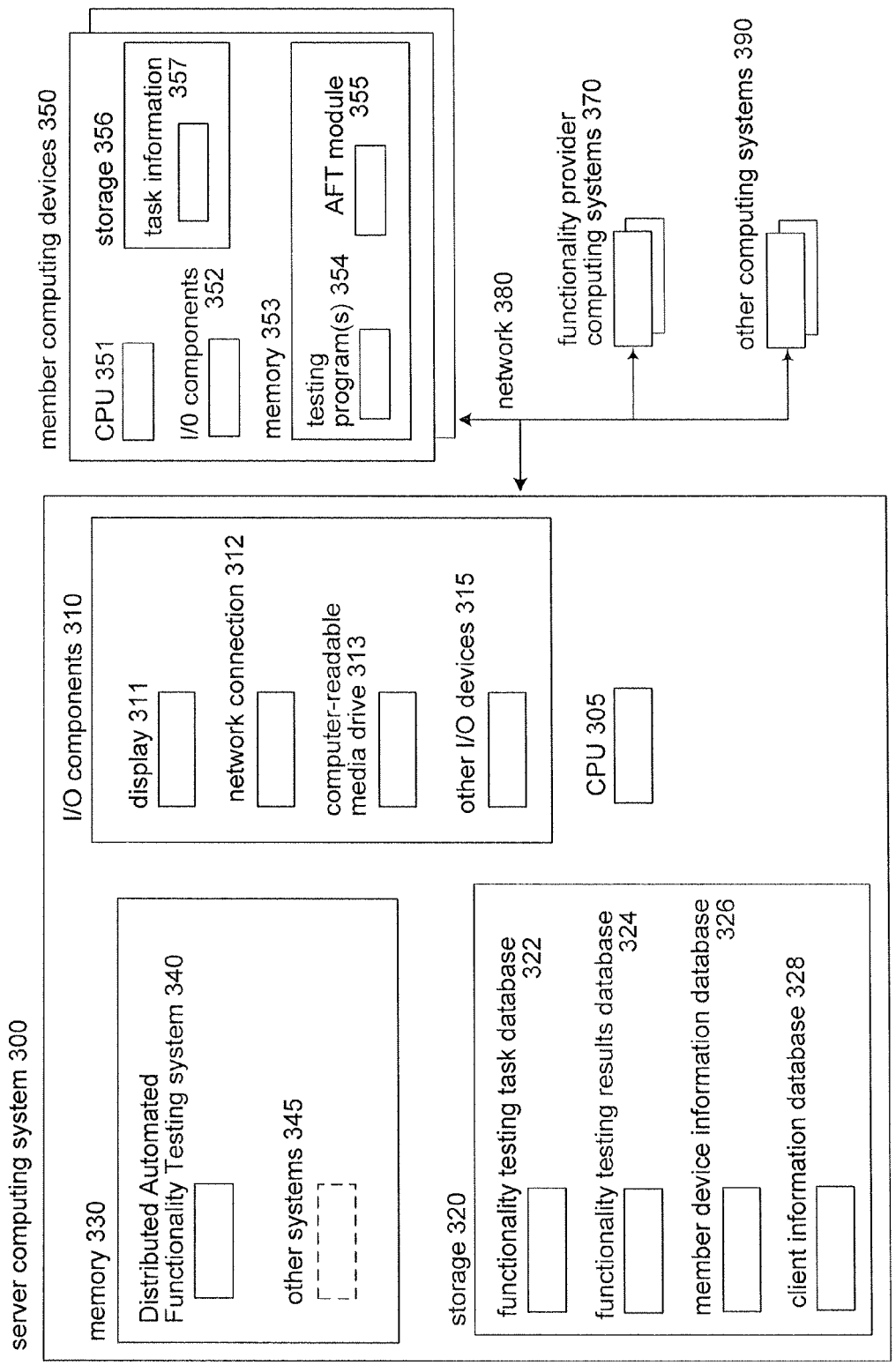
FIG. 3 is a block diagram illustrating an example computing system suitable for executing an embodiment of a system that facilitates distributed automated testing of network-accessible functionality providers.

FIG. 3 is a block diagram illustrating a computing system suitable for executing an embodiment of a distributed automated functionality testing system that facilitates distributed automated testing of network-accessible functionality. In particular, FIG. 3 illustrates a server computing system 300 suitable for executing an embodiment of a distributed automated functionality testing system 340, as well as various member computing devices 350, functionality provider computing systems 370 used to provide target functionality of interest, and optional other computing systems 390. In the illustrated embodiment, the server computing system 300 comprises hardware components that include one or more CPU processors 305, various I/O components 310, storage 320, and memory 330, with the illustrated I/O components including a display 311, a network connection 312, a computer-readable media drive 313, and other I/O devices 315 (e.g., a keyboard, mouse, speakers, etc.). The member computing devices 350 each similarly include one or more CPU processors 351, various I/O components 352, storage 356, and memory 353, although particular I/O components are not illustrated in this example. The other computing systems 370 and 390 may each similarly include some or all such hardware components, but those components are not illustrated in this example for the sake of brevity.

In this illustrated embodiment, the distributed automated functionality testing system 340 is executing in the memory 330, and in at least some embodiments includes software instructions that when executed by the CPU 305 programs the server computing system 300 to perform some or all of the described techniques, such as when the distributed automated functionality testing system 340 represents a software implementation of the Distributed Automated Functionality Testing System 100 described with reference to FIG. 1. The system 340 receives and responds to client request to perform distributed testing of indicated target functionality, such as requests received from the functionality provider computing systems 370 and/or other computing systems 390. The automated operations of the system 340 may include, for each of one or more clients, selecting appropriate member computing devices to use for the distributed testing to be performed (e.g., in accordance with any conditions specified by the client in the request), configuring those selected member computing devices to perform appropriate functionality testing tasks to test target functionality of the client being provided by one or more of the functionality provider computing systems 370, initiating the performance of those functionality testing tasks by those selected member computing devices, obtaining and aggregating results of the performance of those functionality testing tasks, and assessing specified performance criteria based at least in part on those aggregated results. In addition, the system 340 may in some embodiments interact with one or more other systems 345 that optionally execute in the memory 330, such as to monitor aspects of the operation of the system 340, to act as clients of the system 340 for target functionality provided by the systems 345, etc. The system 340 may further store various information in this example in the functionality testing task database 322 data structure on storage 320 about functionality testing tasks performed by member computing devices as part of distributed testing that is performed (such as in a manner similar to information 130 of FIG. 1), in the functionality testing results database 324 data structure on storage 320 about results of performing functionality testing tasks and assessing performance criteria (such as in a manner similar to information 140 of FIG. 1), in the member device information database 326 data structure on storage 320 about member computing devices and their associated users (such as in a manner similar to information 150 of FIG. 1), and in the client information database 328 data structure on storage 320 about clients for whom distributed testing is performed (such as in a manner similar to information 120 of FIG. 1). While not illustrated here, the distributed automated functionality testing system 340 may include multiple modules that each performs a subset of the functionality of the system 340, such as a first module that registers member computing devices, a second module that interacts with clients to receive requests for distributed testing and to provide results of the distributed testing, a third module that interacts with member computing devices to achieve distributed testing for clients, etc.

In this illustrated embodiment, each of the member computing devices is executing a client module 355 of the system 340 in memory 353, as well as optionally executing one or more testing programs 354 in memory 353 for use in performing functionality testing tasks for the system 340. As discussed in greater detail elsewhere, the client module may interact with the system 340 in various manners and at various times. The member computing devices may also each store various information 357 on storage 356 about functionality testing tasks and associated results, including information supplied by the system 340 to configure the member computing device to perform particular distributed testing.

It will be appreciated that computing systems 300, 370 and 390 and member computing devices 350 are merely illustrative and are not intended to limit the scope of embodiments of the present disclosure. The distributed automated functionality testing system 340 may instead be executed by multiple interacting computing systems or devices in some embodiments, and computing system 300 may be connected to other devices that are not illustrated, including through one or more networks such as the Internet, via the World Wide Web ("Web"), or other electronic communications network (e.g., cellular based network, public switched telephone network). More generally, a computing system or computing device may comprise any combination of hardware and/or firmware that can interact in the described manners, optionally when programmed or otherwise configured with particular software, including (without limitation) desktop or other computers (e.g., laptop devices, netbook devices, tablet devices, etc.), smart phones, network devices, PDAs, cell phones, wireless phones, pagers, electronic organizers, Internet appliances, television-based systems (e.g., using set-top boxes and/or personal/digital video recorders), game consoles, media players and various other consumer products that include appropriate inter-communication capabilities. In addition, the functionality provided by the distributed automated functionality testing system 340 may in some embodiments be provided via various modules, as noted above.

It will also be appreciated that, while various items are discussed or illustrated as being stored in memory or on storage while being used, these items or portions of them can be transferred between memory and other storage devices for purposes of memory management and data integrity. Alternatively, in other embodiments some or all of the software systems and/or modules may execute in memory on another device and communicate with the illustrated computing systems via inter-computer communication. Furthermore, in some embodiments, some or all of the systems and/or modules may be implemented or provided in other manners, such as at least partially using firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems, modules and/or data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4:
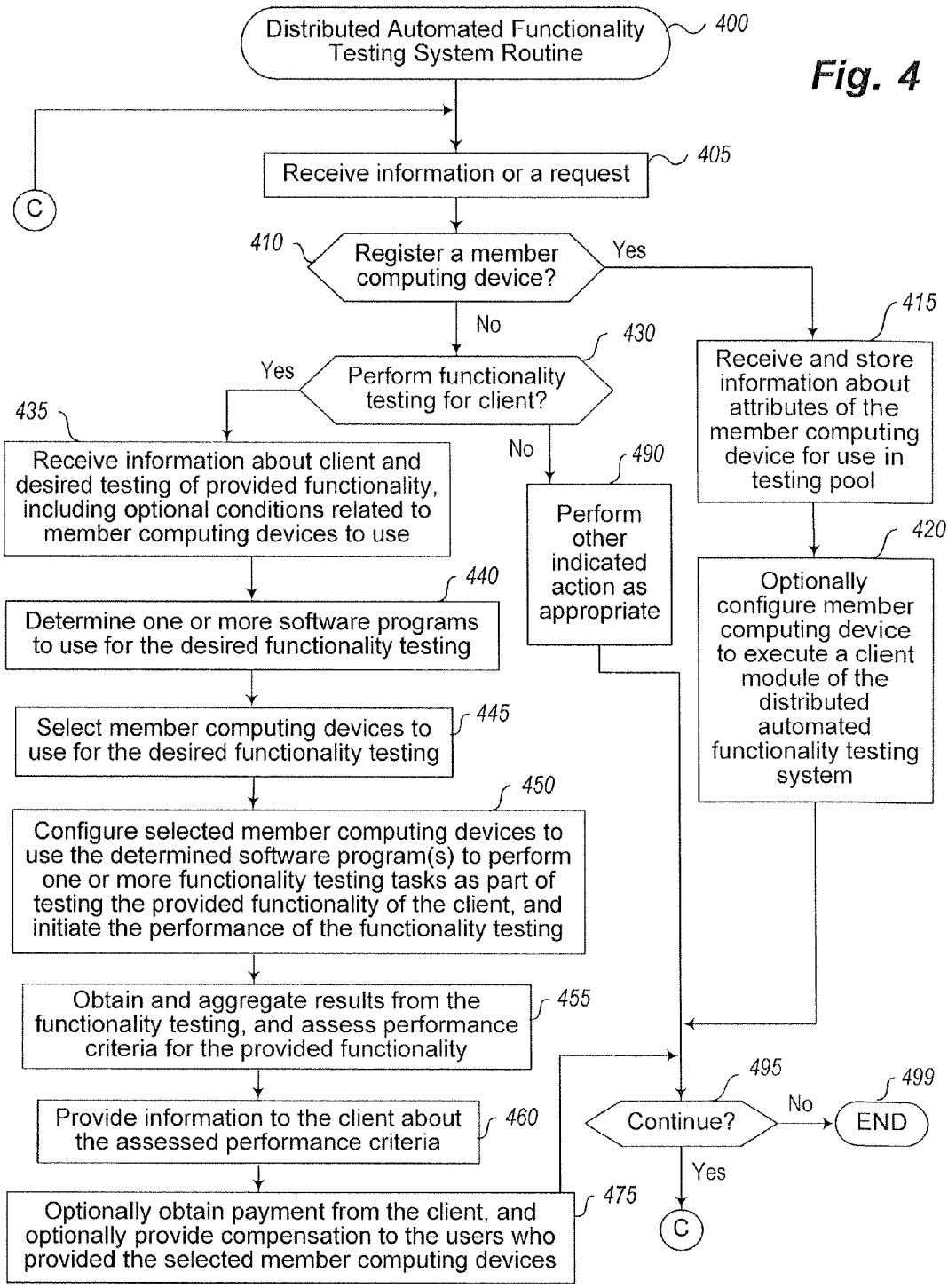
FIG. 4 is a flow diagram of an example embodiment of a Distributed Automated Functionality Testing System routine.

FIG. 4 is a flow diagram of an example embodiment of a Distributed Automated Functionality Testing System routine 400. The routine may be provided by, for example, execution of an embodiment of the Distributed Automated Functionality Testing system 100 of FIG. 1 and/or the distributed automated functionality testing system 340 of FIG. 3, such as to facilitate distributed automated testing of network-accessible functionality. While the illustrated embodiment of the routine uses member computing devices to perform functionality testing tasks as part of distributed testing of target functionality for clients, in other embodiments the system may instead use such member computing devices to perform other types of tasks.

The illustrated embodiment of the routine 400 begins at block 405, where information and/or a request is received. The routine continues to block 410 to determine whether a request to register a member computing device has been received, to enable the member computing device to be part of a testing pool of devices for the distributed automated functionality testing system. If so, the routine continues to block 415 to receive and store information about the member computing device and associated user, including relevant attributes of the member computing device, any preference information for the user, etc. The routine may further determine one or more aggregation groups in which to place the member computing device, such as based on attributes of the member computing device. In block 420, the routine then optionally configures the member computing device to execute a client module of the distributed automated functionality testing system to enable later interactions with the distributed automated functionality testing system, as well as to optionally load one or more testing programs on the member computing device for later use in performing distributed testing. While not illustrated here, in some embodiments the newly registered member computing device may be immediately selected and configured to perform one or more functionality testing tasks, such as if the distributed automated functionality testing system did not previously have sufficient member computing devices to perform those functionality testing tasks.

If it is instead determined in block 410 that a request is not received in block 405 to register a member computing device, the routine continues instead to block 430 to determine if a request is received in block 405 from a client to perform distributed testing for the client. If so, the routine continues to block 435 to obtain information about the desired testing and optionally about the client (e.g., if the client has not previously registered with the distributed automated functionality testing system), such as based on information received in block 405 or by interacting with the client to obtain the information. The received information may include information about the target functionality to be tested and about the distributed testing to be performed, as described in greater detail elsewhere. After block 435, the routine continues to block 440 to determine one or more software programs to be used for the distributed testing for the client, such as a software program provided by the client or one of one or more software programs provided by the distributed automated functionality testing system. In other embodiments, such determination of a software program may not be performed, such as if the distributed automated functionality testing system performs only a single type of testing using a single testing program. In block 445, the routine then selects member computing devices to use for the distributed testing. As described in greater detail elsewhere, such selection of member computing devices may in some embodiments and situations be based on various attributes of the member computing devices and/or on various current condition information, and may optionally include selecting a subset of the member computing devices (e.g., a subset of all of the member computing devices that satisfy particular conditions specified for the distributed testing). In other embodiments, such selection of member computing devices may not be performed, such as if all member computing devices are used for the distributed testing.

After block 445, the routine continues to block 450 to configure each of the selected member computing devices to perform the distributed testing, including in this example embodiment to use the determined software program(s) to perform one or more functionality testing tasks, and initiates the performance of the functionality testing tasks. As discussed in greater detail elsewhere, the configuring of such a selected member computing device to perform a particular set of distributed testing may in some embodiments and situations include loading one or more software programs on the member computing device (e.g., the determined software programs) and/or storing various types of information on the selected member computing device related to the particular set of distributed testing to be performed. In other embodiments, the initiating of the performance of the functionality testing tasks may instead occur at a later time, such as if the configuration is performed for later scheduled distributed testing (or later distributed testing that is initiated in other manners, such as when one or more specified criteria are satisfied). In block 455, at a later time when the performance of the functionality testing tasks by the selected member computing devices has been performed, the results of the performance of the functionality testing tasks are obtained and optionally aggregated. In addition, one or more specified performance criteria for the target functionality are assessed, whether dynamically by the routine in block 455 based on the obtained results, or instead by selecting assessed performance criteria information that was generated by the selected member computing devices and provided with the results. In block 460, the routine then provides information to the client about the assessed performance criteria information, although in other embodiments the information may be provided to the client at other times or in other manners. In block 475, the routine then optionally obtains payment from the client, although in other embodiments the distributed testing may instead be performed without payment, or the payment may be obtained at other times (e.g., when the information is received in block 435, if the corresponding fees to be charged can be determined at that time). In addition, the routine in block 475 also optionally provides compensation to the users associated with the selected member computing devices used in the distributed testing, such as a portion of the payment obtained from the client, although in other embodiments the compensation may have other forms, the use of the member computing devices may instead be provided without compensation, or the compensation may be provided at other times (e.g., periodically).

If it is instead determined in block 430 that a request is not received in block 405 to perform distributed testing for the client, the routine continues instead to block 490 to perform one or more other indicated operations as appropriate. Such other operations may be of various types in various embodiments, such as to change the status of previously registered member computing devices (e.g., to remove them from the testing pool temporarily or permanently), to change the status of distributed testing for a client (e.g., to halt distributed testing being performed, whether temporarily or permanently; to initiate the performance of distributed testing that was previously requested but scheduled for later performance; etc.), to change stored information about a member computing device (e.g., a change in attribute values, a change in current condition information being monitored, etc.), to provide requested information to users about the use of their member computing devices (e.g., an amount of compensation earned), to provide requested information to clients about distributed testing performed for them (e.g., current status information, such as for monitoring purposes; results of completed distributed testing; information about fees corresponding to the distributed testing; etc.), to register clients with the distributed automated functionality testing system before corresponding distributed testing requests are received (e.g., to obtain client preference information, payment source information, etc.), to change stored information about a user associated with a member computing device, to change stored information about a client, etc.

After blocks 420, 475 or 490, the routine continues to block 495 to determine whether to continue, such as until an explicit instruction to terminate is received. If it is determined to continue, the routine returns to block 405, and otherwise continues to block 499 and ends.

FIG. 5 is a flow diagram of an example embodiment of a Member Computing Device routine 500. The routine may be provided by, for example, execution of an embodiment of a client module of the distributed automated functionality testing system, such as the modules 185 of FIG. 2 and/or the modules 355 of FIG. 3, such as to facilitate automated testing of network-accessible functionality by a member computing device on which the client module executes. While the illustrated embodiment of the routine uses member computing devices to perform functionality testing tasks as part of distributed testing of target functionality for clients, in other embodiments the member computing devices may be used to perform other types of tasks.

The routine begins in block 505, where instructions are received related to testing of target functionality of a client. In block 510, the routine determines whether the instructions are to initiate the performance of new testing, and if so continues to block 515 to configure the member computing device to the perform the indicated functionality testing. As discussed in greater detail elsewhere, such configuration may include loading and/or executing one or more testing programs, configuring particular parameters used to interact with particular target provider computing systems and/or assess specified performance criteria, etc. After block 515, the routine continues to block 520 to execute one or more testing programs to perform indicated functionality testing tasks, such as to interact with one or more target provider computing systems in specified manners. In other embodiments, the routine 500 may directly perform at least some of the functionality testing tasks without the use of other testing programs.

In block 525, at a later time when the performance of the functionality testing tasks by the member computing device has been performed, the results of the performance of the functionality testing tasks are analyzed in order to assess one or more specified performance criteria for the target functionality being tested, although in other embodiments some or all of the performance criteria assessment is instead performed by the distributed automated functionality testing system (e.g., by an embodiment of routine 400 of FIG. 4). In the illustrated embodiment, the routine then continues to block 530 to store the generated results and any information from the analysis. In block 535, the routine determines whether there are additional functionality testing tasks to perform, such as task previously specified in block 515 and/or tasks that are triggered based on analysis performed in block 530 (e.g., to obtain additional testing information if a minimum threshold has not been reached for a quantity of testing or an uncertainty level). If so, the routine returns to block 520, and otherwise continues to block 570 to provide the generated results from the performed functionality testing tasks and any information from its analysis (e.g., information stored in block 530) to the distributed automated functionality testing system, such as is previously described with respect to block 455 of FIG. 4. The routine then continues to block 580 in the illustrated embodiment to optionally perform various cleanup activities on the member computing device, such as to remove (or otherwise protect from user access) data that was used to perform the testing tasks and/or generated by the testing tasks, remove testing programs used, etc. In addition, as discussed in greater detail elsewhere, a user who provides a member computing device may in at least some embodiments and situations take over the use of the member computing device while testing tasks are being performed (e.g., if the member computing device is made available only for use during idle times)—while not illustrated in the illustrated routine, such a user takeover may initiate performance of some or all of the operations of block 580 (optionally any providing generated results, if any, from the testing that has been performed to the distributed automated functionality testing system, such as in a manner similar to block 570). If so, and if those testing tasks are later resumed, some or all of the initial configuration activities for the member computing device may be performed again.

If it is instead determined in block 510 that a request is not received in block 505 to perform new distributed testing for a client, the routine continues instead to block 590 to perform one or more other indicated operations as appropriate. Such other operations may be of various types in various embodiments, such as to perform configuration activities for the member computing device, such as loading of testing programs and/or storing of information to be used for performing testing tasks (e.g., as initiated with respect to block 450 of FIG. 4); to change the status of distributed testing for a client (e.g., to halt distributed testing being performed, whether temporarily or permanently; to initiate the performance of distributed testing that was previously configured but scheduled for later performance; etc.), to request current information about the member computing device (e.g., one or more current attribute values, current condition information, etc.), to provide an indication of an amount of compensation earned by the member computing device (e.g., a virtual credit to be later used in other activities by the member computing device), etc.

After blocks 580 or 590, the routine continues to block 595 to determine whether to continue, such as until an explicit instruction to terminate is received. If it is determined to continue, the routine returns to block 505, and otherwise continues to block 599 and ends.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, it will be appreciated that in other embodiments the operations may be performed in other orders and in other manners. It will also be appreciated that the data structures discussed above may be structured in different manners, including with respect to database data structures and Web page data structures, such as by having a single data structure split into multiple data structures or by having multiple data structures consolidated into a single data structure. Similarly, in some embodiments, illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the disclosure. In addition, while certain aspects are presented below in certain claim forms, the inventors contemplate the various aspects in any available claim form. For example, while only some aspects of the disclosure may currently be recited as being embodied in a computer-readable medium, other aspects may likewise be so embodied.

What is claimed is:

1. A computer-implemented method, comprising:
receiving, by one or more configured computing systems of a distributed automated functionality testing system that has a plurality of registered member computing devices available to perform functionality testing tasks, information about indicated functionality of a target online service that is to be tested, the member computing devices being owned by a plurality of users who are not associated with each other or with the distributed automated functionality testing system other than by registering the member computing devices with the distributed automated functionality testing system as being available for later use;
determining, by the one or more configured computing systems, a plurality of functionality testing tasks to be performed to assess one or more performance criteria for the indicated functionality of the target online service;
configuring, by the one or more configured computing systems, at least some of the plurality of registered member computing devices to perform the plurality of functionality testing tasks by having each configured member computing device automatically perform one or more of the plurality of functionality testing tasks, and initiating performing of the plurality of functionality testing tasks on the configured member computing devices, the performing of the plurality of functionality testing tasks by the configured member computing devices including interacting with one or more server computing systems of the target online service by sending a plurality of requests in a distributed manner over one or more computer networks from the configured member computing devices to the one or more server computing systems and by receiving a plurality of responses from the one or more server computing systems over the one or more computer networks to the sent plurality of requests;
after obtaining results from the performing of the plurality of functionality testing tasks on the configured member computing devices, assessing, by the one or more configured computing systems, the one or more performance criteria for the indicated functionality of the target online service based on an aggregation of the obtained results, wherein the obtained results are based at least in part on the received plurality of responses, and wherein the assessed one or more performance criteria are based at least in part on performance of the one or more server computing systems in responding to the sent plurality of requests; and providing one or more indications of the assessed one or more performance criteria for the indicated functionality of the target online service.

2. The method of claim 1 wherein the at least some member computing devices are a subset of the plurality of registered member computing devices, and wherein the method further comprises, before the configuring of the at least some member computing devices, selecting, by the one or more configured computing systems, the at least some member computing devices to use for the performing of the plurality of functionality testing tasks based at least in part on information specific to the at least some member computing devices.

3. The method of claim 2 wherein the at least some member computing devices are associated with one or more geographic locations at which the at least some member computing devices are located, and wherein the selecting of the at least some member computing devices to use for the performing of the plurality of functionality testing tasks is based at least in part on the associated one or more geographic locations.

4. The method of claim 3 wherein the associated one or more geographic locations include a plurality of geographic locations, wherein each of the at least some member computing devices is associated with one of the plurality of geographic locations, and wherein the selecting of the at least some member computing devices is performed at least in part to have geographic diversity in the at least some member computing devices that perform the plurality of functionality testing tasks.

5. The method of claim 2 wherein the at least some member computing devices each has an associated value for each of one or more attributes that reflect a computing environment of the member computing device, and wherein the selecting of the at least some member computing devices to use for the performing of the plurality of functionality testing tasks is based at least in part on the associated values of the at least some member computing devices for at least one of the one or more attributes.

6. The method of claim 2 wherein the received information is part of a request from the target online service to perform the assessing of the one or more performance criteria, wherein the request includes one or more conditions specified by the target online service related to which member computing devices to use for the performing of the assessing of the one or more performance criteria, and wherein the selecting of the at least some member computing devices to use for the performing of the plurality of functionality testing tasks is based at least in part on the specified one or more conditions from the target online service.

7. The method of claim 1 wherein the performing of the plurality of functionality testing tasks by the configured member computing devices is part of performing at least one of distributed load testing and of distributed stress testing of the indicated functionality of the target online service.

8. The method of claim 1 wherein the assessing of the one or more performance criteria for the indicated functionality of the target online service includes assessing at least one of latency and of error rate of the one or more server computing systems of the target online service in providing the indicated functionality.

9. The method of claim 1 wherein the indicated functionality of the target online service includes providing streaming interactive content, and wherein the performing of the plurality of functionality testing tasks by the configured member computing devices includes requesting streaming interactive content from the one or more server computing systems of the target online service, performing real-time decoding of streamed video content received in response to the requesting, and sending information to the one or more server computing systems of the target online service to simulate interactive input that affects future interactive content to be streamed.

10. The method of claim 1 wherein the configuring of the at least some member computing devices to perform the plurality of functionality testing tasks includes configuring each of the at least some member computing devices to execute one or more testing programs and to store information to enable the interacting with the one or more server computing systems of the target online service.

11. The method of claim 1 further comprising providing compensation to multiple of the plurality of users who are owners of the at least some member computing devices in exchange for using the at least some member computing devices for the performing of the plurality of functionality testing tasks.

12. The method of claim 11 wherein the performing of the plurality of functionality testing tasks is for a client of the distributed automated functionality testing system in exchange for monetary payment received from the client, and wherein the providing of the compensation to the multiple users includes:

retrieving information about a standardized unit of work that is defined for the distributed automated functionality testing system to measure contribution of a member computing device to operations of the distributed automated functionality testing system;

for each of the at least some member computing devices, determining a quantity of defined standardized units of work that the member computing device provides as part of performing the one or more functionality testing task for that member computing device; and providing a portion of the received monetary payment from the client to the multiple users, the providing of the portion of the monetary payment including allocating a share of the portion of the monetary payment to each of the at least some member computing devices in an amount that is in proportion to the determined quantity of defined standardized units of work for the member computing device.

13. The method of claim 1 further comprising, before the receiving of the information about the indicated functionality, registering each of the plurality of member computing devices with the distributed automated functionality testing system, the registering of each of the plurality of member computing devices including:

providing other functionality to the member computing device that is requested by one of the plurality of users who owns the member computing device;

querying the one user to enable the one user to opt to register the member computing device with the distributed automated functionality testing system; and in response to an affirmative response by the one user to the querying, initiating the registering of the member computing device with the distributed automated functionality testing system.

14. A non-transitory computer-readable medium having stored contents that configure a computing system to provide a functionality testing service by:
    registering, by the configured computing system, a plurality of member computing devices that are controlled by multiple users, the registered plurality of member computing devices being made available by the multiple users for use by the functionality testing service in providing testing functionality for clients of the functionality testing service;
    receiving information about indicated functionality available from one or more target computing systems of an indicated client of the functionality testing service;
    configuring, by the configured computing system, at least some member computing devices of the plurality to perform a plurality of automated tasks to assess one or more performance criteria for the indicated functionality available from the one or more target computing systems;
    initiating, by the configured computing system, performing by each of the configured member computing devices of one or more selected automated tasks of the plurality of automated tasks, the performing of the selected automated tasks by each of the configured member computing devices including interacting with the one or more target computing systems by sending a plurality of requests in a distributed manner over one or more computer networks from the configured member computing devices to the one or more target computing systems and by receiving a plurality of responses from the one or more target computing systems over the one or more computer networks to the sent plurality of requests;
    assessing, by the configured computing system, the one or more performance criteria for the indicated functionality of the target computing systems based on results that are obtained from performing of the plurality of automated tasks by the configured member computing devices, wherein the obtained results are based at least in part on the received plurality of responses, and wherein the assessed one or more performance criteria are based at least in part on performance of the one or more target computing systems in responding to the sent plurality of requests; and
    providing one or more indications of the assessed one or more performance criteria for the indicated functionality.

15. The non-transitory computer-readable medium of claim 14 wherein the stored contents further configure the computing system to receive information about a defined standardized unit of work for use in measuring amounts of work performed by the plurality of member computing devices, and to track a quantity of the standardized units of work performed by each of the configured at least some member computing devices as part of the performing of the plurality of automated tasks.

16. The non-transitory computer-readable medium of claim 15 wherein the stored contents further configure the computing system to provide compensation to one or more of the multiple users who control the configured at least some member computing devices to reflect the performing of the plurality of automated tasks by the configured at least some member computing devices, and wherein an amount of the compensation provided for each of the configured at least some member computing devices is based at least in part on the tracked quantity of standardized units of work for the member computing device.

17. The non-transitory computer-readable medium of claim 15 wherein the plurality of member computing devices include heterogeneous hardware components, the heterogeneous hardware components including multiple distinct types of processors, and wherein the standardized unit of work is one of one or more provided standardized work units and is defined for use with the heterogeneous hardware components in a manner that is independent of the multiple distinct types of processors.

18. The non-transitory computer-readable medium of claim 14 wherein the received information about the indicated functionality includes a request from the indicated client to assess the performance criteria for the indicated functionality, and wherein the plurality of automated tasks are functionality testing tasks.

19. The non-transitory computer-readable medium of claim 14 wherein the one or more target computing systems are part of a target online service operated by the indicated client, and wherein the stored contents further configure the computing system to:
    select the at least some member computing devices to configure based in part on information specified by the indicated client; and
    determine the plurality of automated tasks to be performed by the configured member computing devices based at least in part on the received information about the indicated functionality.

20. The non-transitory computer-readable medium of claim 14 wherein the configuring of the at least some member computing devices to perform the plurality of automated tasks includes loading one or more testing programs on each of one or more of the configured at least some member computing devices, and wherein the stored contents further configure the computing system to, after the performing of the plurality of automated tasks by the configured member computing devices, initiate cleanup activities for each of the one or more configured member computing devices that include at least one of removing the loaded one or more testing programs from the configured member computing device and of removing data from the configured member computing device that is generated from the performing of the selected one or more tasks by the configured member computing device.

21. The non-transitory computer-readable medium of claim 14 wherein the computer-readable medium is a memory of the configured computing system, and wherein the contents are instructions that when executed program the configured computing system to perform the method.

22. A system comprising:
    one or more hardware processors; and
    a functionality testing system that is configured to, when executed by at least one of the one or more hardware processors, provide testing functionality to multiple clients by:
        registering a plurality of member computing devices that are controlled by multiple users who have indicated that the member computing devices are available for use by the functionality testing system with clients of the functionality testing system;
        receiving information about indicated functionality available from one or more target computing systems of an indicated client of the functionality testing system;

configuring at least some of the plurality of member computing devices to each perform one or more automated selected functionality testing tasks to assess one or more performance criteria for the indicated functionality available from the one or more target computing systems of the indicated client;

initiating performing of the one or more selected functionality testing tasks on each of the configured member computing devices, the performing of the selected functionality testing tasks including interacting with the one or more target computing systems of the client by sending a plurality of requests in a distributed manner over one or more computer networks from the configured member computing devices to the one or more target computing systems and by receiving a plurality of responses from the one or more target computing systems over the one or more computer networks to the sent plurality of requests;

assessing the one or more performance criteria for the indicated functionality of the one or more target computing systems of the indicated client based on results that are obtained from the performing of the selected functionality testing tasks by the configured member computing devices, wherein the obtained results are based at least in part on the received plurality of responses, and wherein the assessed one or more performance criteria are based at least in part on performance of the one or more target computing systems in responding to the sent plurality of requests; and providing one or more indications of the assessed one or more performance criteria for the indicated functionality.

23. The system of claim 22 wherein the one or more target computing systems are part of a target online service provided by the indicated client, and the configuring of the at least some member computing devices includes determining the selected functionality testing tasks to be performed by the configured member computing devices based at least in part on the received information about the indicated functionality available from the target computing systems of the indicated client.

24. The system of claim 22 further comprising the plurality of member computing devices, and wherein each of the plurality of member computing devices is configured to execute a software module of the functionality testing system.

25. The system of claim 22 wherein the functionality testing system is a distributed automated functionality testing system that includes software instructions for execution by the one or more hardware processors.

26. The system of claim 22 wherein the functionality testing system consists of one or more means for performing the providing of the testing functionality to the multiple clients.

* * * * *